United States Patent
Becker-Weimann et al.

(10) Patent No.: US 8,653,219 B2
(45) Date of Patent: Feb. 18, 2014

(54) METHOD FOR PRODUCING REACTIVE POLYURETHANE COMPOSITIONS

(75) Inventors: Klaus Becker-Weimann, Karlsruhe (DE); Walter Höhn, Walzbachtal (DE); Michael Fahrländer, Stutensee (DE)

(73) Assignee: Klebchemie M.G. Becker GmbH & Co. KG, Weingarten/Baden (DE)

( * ) Notice: Subject to any disclaimer, the term of this patent is extended or adjusted under 35 U.S.C. 154(b) by 472 days.

(21) Appl. No.: 11/791,693

(22) PCT Filed: Nov. 28, 2005

(86) PCT No.: PCT/EP2005/012688
§ 371 (c)(1),
(2), (4) Date: Jul. 26, 2007

(87) PCT Pub. No.: WO2006/056472
PCT Pub. Date: Jun. 1, 2006

(65) Prior Publication Data
US 2008/0009592 A1    Jan. 10, 2008

(30) Foreign Application Priority Data
Nov. 26, 2004  (DE) .......................... 10 2004 057 292

(51) Int. Cl.
*C08G 18/10* (2006.01)
(52) U.S. Cl.
USPC ................... 528/59; 528/60; 528/61; 528/65; 528/66; 528/77; 528/80; 528/85
(58) Field of Classification Search
USPC .......... 525/454, 452, 453; 528/59, 61, 65, 66, 528/80, 60, 67, 77, 85; 560/25, 26, 115, 560/158
See application file for complete search history.

(56) References Cited

U.S. PATENT DOCUMENTS

| | | | | |
|---|---|---|---|---|
| 3,394,164 A | * | 7/1968 | McClellan et al. | ........... 560/333 |
| 3,663,513 A | * | 5/1972 | Kazama et al. | ........... 528/59 |
| 4,413,111 A | * | 11/1983 | Markusch et al. | ........... 528/59 |
| 4,672,100 A | * | 6/1987 | Schonbachler et al. | ........ 528/75 |
| 4,889,915 A | * | 12/1989 | Brauer et al. | ................ 525/458 |
| 6,280,561 B1 | | 8/2001 | McInnis et al. | |
| 6,365,700 B1 | * | 4/2002 | Graham | ........... 528/60 |
| 6,844,073 B1 | | 1/2005 | Helmeke et al. | |
| 2002/0056518 A1 | * | 5/2002 | Shah | ........... 156/331.4 |
| 2003/0162933 A1 | * | 8/2003 | Hippold et al. | ................. 528/44 |
| 2004/0162385 A1 | | 8/2004 | Krebs | |
| 2005/0032973 A1 | | 2/2005 | Krebs et al. | |

FOREIGN PATENT DOCUMENTS

| | | |
|---|---|---|
| EP | 0107014 A1 | 5/1984 |
| EP | 0827995 A2 | 3/1998 |
| EP | 1404733 A1 | 4/2004 |
| EP | 1434811 A1 | 7/2004 |
| JP | 55-123616 A | 9/1980 |
| JP | 59-81323 A | 5/1984 |
| JP | 3-86719 A | 4/1991 |
| JP | 10-88077 A | 4/1998 |
| JP | 2005-505664 A | 2/2005 |
| WO | WO 03/006521 A1 | 1/2003 |
| WO | WO 03/033562 A1 | 4/2003 |
| WO | WO-03/060033 A1 | 7/2003 |

OTHER PUBLICATIONS http://baycoll.com/bms/db-rsc/bms_rsc_cas.nsf/id/COEN_Products_by_Trade_name?open&line=Desmodur%C2%AE.*
Evonik Degussa DYNACOLL® 7250 Copolyester Data Sheet. http://www.matweb.com/search/datasheet_print.aspx?matguid=6432b01394224a94ad37790fa906063e.*
Evonik Degussa DYNACOLL® 7360 Copolyester. http://www.matweb.com/search/datasheet_print.aspx?matguid=87f1789d2a1f42e69f338755ff25b7c2.*

* cited by examiner

*Primary Examiner* — Michael L Leonard
(74) *Attorney, Agent, or Firm* — Birch, Stewart, Kolasch & Birch, LLP

(57) ABSTRACT

Proposed is a process for preparing a reactive polyurethane composition that is characterized in that
in a first process stage, from an isocyanate-reactive polymer or mixture of isocyanate-reactive polymers with a fraction of at least 90%, preferably at least 95%, more preferably at least 99% by weight of linear molecules, by reaction with a polyisocyanate having a molecular weight <500, in a molar deficit of the isocyanate groups of the polyisocyanate relative to the isocyanate-reactive end groups of the polymer or mixture of polymers, a monomer-free thermoplastic polyurethane is prepared which
in a second process stage is reacted with a low-monomer-content, isocyanate-terminal prepolymer, in a molar ratio of the isocyanate-reactive end groups of the thermoplastic polyurethane to the isocyanate groups of the prepolymer of 1:1.1 to 1:5, to give the isocyanate-reactive polyurethane composition.

17 Claims, No Drawings

METHOD FOR PRODUCING REACTIVE POLYURETHANE COMPOSITIONS

This application is a U.S. National Phase application under 35 U.S.C. §371 of International Application No. PCT/EP05/012688, filed Nov. 28, 2005. Priority under 35 U.S.C. §119 (a)-(d) is claimed to German patent application No. 10 2004 057 292.5, filed Nov. 26, 2004.

The invention relates to a process for preparing a reactive polyurethane composition, a reactive polyurethane composition prepared accordingly, and a use.

Reactive polyurethane compositions which cure via atmospheric moisture are conquering new fields of application all the time, particularly in the area of adhesives and coating materials. Reactive hotmelt adhesives based on polyurethane, in particular, display an outstanding profile of properties. At the application temperature they are mostly liquids of low viscosity, and on cooling undergo rapid physical breakdown, as a result of which it is possible to achieve very high initial strengths and hence also high application rates.

The physical setting is then followed by chemical crosslinking by the isocyanate groups, which ensures the ultimate strength of the reactive polyurethane adhesives. Apart from the outstanding profile of properties, however, reactive one-component polyurethane compositions have occupational hygiene drawbacks, containing residues of monomeric isocyanates. These are risk substances, and the polyurethane compositions must therefore be labelled as hazardous substances when the amount is >0.1% by weight, based on the total weight of the composition.

A multiplicity of processes have therefore been developed for providing polyurethane compositions which have low residual monomeric diisocyanate contents and which are not subject to mandatory labelling requirements.

DE-A 102 25 982 describes a process for preparing a polyurethane composition having a low diisocyanate monomer fraction by reacting at least one isocyanate-reactive polymer with at least one isocyanate-terminated prepolymer in excess over the isocyanate-reactive polymer, which is substantially free from diisocyanate monomers. The resulting polyurethane composition contains less than 0.1% by weight of monomeric diisocyanate and is therefore not subject to mandatory labelling requirements. The commercially available demonomerized prepolymers, however, generally have reactive isocyanate group contents of below 10% by weight, based on the total weight of the prepolymer. Consequently, large amounts of these prepolymers are necessary in order to produce moisture-reactive hotmelt adhesives. Since, however, the prepolymers are liquid at room temperature, the hotmelt adhesives produced using them have lower initial strengths than the versions without a low monomer content.

Other processes for preparing low-monomer-content reactive polyurethane compositions utilize the difference in reactivity between the isocyanate groups of asymmetric diisocyanates, particularly 2,4'-diphenylmethane diisocyanate. The phenomenon utilized in this case is that the isocyanate group in para position reacts, for steric reasons, much more quickly with hydroxyl functionalities than does the isocyanate group in ortho position. Reaction products of this kind are described for example in DE-A 101 50 722. The reaction products are obtained from 2,4'-diphenylmethane diisocyanate with at least one polyether polyol and/or polyalkylene diol having a molecular weight below 1000, and/or with a crystalline, partially crystalline or glassily amorphous polyester polyol, and have a residual monomeric diisocyanate content of less than 0.5%, preferably of less than 0.25% by weight, and also a high melt stability and a low viscosity. The process, however, is unable to give a reliable guarantee of an even lower residual monomeric diisocyanate content, of <0.1% by weight, which would be necessary for a product not to be subject to mandatory labelling requirements. Furthermore, when used as hotmelt adhesives, the resultant polyurethane compositions exhibit the disadvantage of poor wetting properties for the substrate to be bonded.

In a first step of the process of DE-C 102 15 641 at least one isocyanate-reactive polymer is reacted with at least one monomeric diisocyanate and then, in a second step of the process, the reaction products from the first step are mixed with an isocyanate-terminated prepolymer. The polymer compositions obtained feature better wettability and a lower residual monomeric diisocyanate content. With this process as well there is no reliable guarantee that the reactive polyurethane compositions thus prepared will have a residual monomer content of <than 0.1% by weight, based on the overall composition.

It was therefore an object of the invention to provide a process for preparing reactive polyurethane compositions which are not subject to mandatory labelling requirements and which have tailor-made properties for use as one-component hotmelt adhesives or coating materials; in particular, which have initial strengths comparable with those of non-monomer-reduced hotmelt adhesives.

The achievement lies in a process for preparing a reactive polyurethane composition which is characterized in that in a first process stage, from an isocyanate-reactive polymer or mixture of isocyanate-reactive polymers with a fraction of at least 90%, preferably at least 95%, more preferably at least 99% by weight of linear molecules, by reaction with a polyisocyanate having a molecular weight <500, in a molar deficit of the isocyanate groups of the polyisocyanate relative to the isocyanate-reactive end groups of the polymer or mixture of polymers, a monomer-free thermoplastic polyurethane is prepared which contains isocyanate-reactive end groups and which in a second process stage is reacted with a low-monomer-content, isocyanate-terminal prepolymer, in a molar ratio of the isocyanate-reactive end groups of the thermoplastic polyurethane to the isocyanate groups of the prepolymer of 1:1.1 to 1:5, to give the reactive polyurethane composition.

In the first step of the process an isocyanate-reactive polymer or mixture of isocyanate-reactive polymers having a fraction of at least 90%, preferably of at least 95%, more preferably of at least 99% by weight of linear molecules is used. The end groups of the polymer or of the mixture-forming polymers here may be preferably hydroxyl groups, amino groups, carboxyl groups, carboxylic anhydride groups and/or mercapto groups.

Preferred isocyanate-reactive polymers are predominantly linear but also branched polyesters, in particular difunctional but also trifunctional polyethylene and polypropylene glycols, polytetrahydrofurans and polyamides and mixtures thereof. It is also possible in this case to use the corresponding copolymers, especially block copolymers.

Particular preference is given to polyester polyols, which may be liquid, glassily amorphous or crystalline and which have a number-average molecular weight of between 400 and 25 000 g/mol, in particular between 1000 and 10 000 g/mol, more preferably between 2000 and 6000 g/mol. Particularly suitable polyester polyols of this kind are available for example under the name Dynacoll® from Degussa AG as commercial products. Further suitable polyester polyols are polycaprolactone polyesters, polycarbonate polyesters and polyester polyols based on fatty acids.

Further preferred isocyanate-reactive polymers are predominantly linear polyalkylene oxides or polyalkylene oxides with low degrees of branching, especially polyethylene oxides, polypropylene oxides or polytetrahydrofurans (polyoxytetramethylene oxides), having a number-average molecular weight of between 250 and 12 000 g/mol, preferably having a number-average molecular weight of between 500 and 4000 g/mol.

The inventors recognize that it is essential in the first stage of the process to use the polyisocyanate in a molar deficit of its isocyanate groups relative to the isocyanate-reactive end groups of the polymer. Preference is given to a ratio of the isocyanate-reactive end groups of the polymer or mixture of polymers to the isocyanate groups of the polyisocyanate in the range from 1.1:1 to 5:1. With particular preference the stated molar ratio is significantly greater than 1, in particular in the range between 2:1 and 3:1.

In the first stage of the process the isocyanate-reactive polymer, which may also be a mixture, is reacted with a polyisocyanate having a molecular weight <500.

The polyisocyanate is preferably a substance or mixture of substances selected from aromatic, aliphatic or cycloaliphatic polyisocyanates having an isocyanate functionality of between 1 and 3, preferably between 1.8 and 2.2, more preferably having an isocyanate functionality of 2.

With particular preference the polyisocyanate having a molecular mass <500 is a substance or mixture of substances from the following enumeration: diisocyanatodiphenylmethanes (MIDs), particularly 4,4'-diisocyanatodiphenylmethane and 2,4'-diisocyanatodiphenylmethane, and mixtures of different diisocyanatodiphenylmethanes; hydrogenated 4,4'-MDI (bis 4-isocyanatocyclohexyl)methane and hydrogenated 2,4'-MDI; tetramethylxylylene diisocyanate (TMXDI); xylylene diisocyanate (XDI); 1,5-diisocyanatonaphthalene (NDI); diisocyanatotoluenes (TDIs), especially 2,4-diisocyanatotoluene, and also TDI urethdiones, especially dimeric 1-methyl-2,4-phenylene diisocyanate (TDI-U), and TDI ureas; 1-isocyanato-3-isocyanatomethyl-3,5,5-trimethylcyclohexane (IPDI) and its isomers and derivatives, especially dimers, trimers and polymers, and also IPDI isocyanurate (IPDI-T); 3,3'-dimethylbiphenyl-4,4'-diisocyanate (TODI); 3,3'-diisocyanato-4,4'-dimethyl-N,N'-diphenylurea (TDIH); hexamethylene 1,6-diisocyanate (HDI). With particular advantage the polyisocyanate is 2,4'-diphenylmethane diisocyanate (2,4'-MDI) with a maximum fraction of the sum of 2,2' and 4,4' isomers of 2.5% by weight, based on the total weight of the polyisocyanate.

The first stage of the process produces, as an intermediate, a monomer-free thermoplastic polyurethane having isocyanate-reactive groups, which may also be termed a prepolymer having free isocyanate-reactive groups.

In a second stage of the process, the thermoplastic polyurethane obtained in the first step is reacted with an isocyanate-terminal prepolymer in excess, i.e. in a molar ratio of the reactive end groups of the thermo-plastic polyurethane to the isocyanate groups of the prepolymer of 1:1.1 to 1.5, to form the end product of the isocyanate-reactive polyurethane composition.

The isocyanate excess in this case must be selected such that the resulting reactive polyurethane composition contains an isocyanate content of at least 0.5%, but preferably at least 1% by weight, based on the overall composition. However, the molar ratio of the isocyanate functionalities to the isocyanate-reactive groups also cannot be increased ad infinitum, since otherwise the initial strength of the reactive polyurethane composition becomes too low. In practice a ratio of 2 to 3 has proved to be particularly appropriate.

The invention is not restricted in terms of the isocyanate-terminated prepolymers that can be used, provided that they are of low monomer content, i.e., their residual monomer content is not greater than 0.5%, preferably less than 0.3%, with particular preference less than 0.1% by weight. Suitable in particular are reaction products of polyethers, preferably of polypropylene glycols, with polyisocyanates, particularly diisocyanatodiphenylmethanes, diisocyanatotoluenes, diisocyanatohexane and/or isocyanato-3-isocyanatomethyl-3,5,5-trimethylcyclohexane (IPDI).

Low-monomer-content, isocyanate-terminated prepolymers of this kind are prepared by reacting polyether polyols with an excess of polyisocyanate. Following the reaction, the monomeric isocyanate still present is removed by means of a thin-film evaporator. These low-monomer-content prepolymers are available commercially and are sold for example by Dow Chemicals under the name Vorastar®.

The reaction in process stages 1 and/or 2 is conducted preferably at a temperature in the range from 80 to 140° C., in particular from 100 to 120° C.

In one advantageous procedure, for the preparation of the thermoplastic polyurethane in the first stage of the process, the isocyanate-reactive polymer or mixture of isocyanate-reactive polymers is freed from water at 120° C. under vacuum. Thereafter reaction takes place with the polyisocyanate at 80 to 140° C., preferably at 100 to 120° C.

The thermoplastic polyurethane thus prepared can be isolated in this form and later, in the second step of the process, can be reacted with a further polyisocyanate component, in particular a demonomerized prepolymer.

It is preferred, however, to carry out the second process step immediately following the first process step, in the same reactor. For that purpose the low-monomer-content prepolymer is added to the thermoplastic polyurethane prepared in the first step of the process, and reaction takes place at 80 to 140° C., preferably at 100 to 120° C.

The reactive polyurethane composition prepared in this way is subsequently dispensed preferably into water-vapor-impermeable containers.

Also provided by the invention is a reactive polyurethane composition obtainable by the process described above.

In particular the reactive polyurethane composition may also comprise non-reactive polymers, tackifying resins, waxes, plasticizers, fillers, additives, accelerants, adhesion promoters, pigments, catalysts, stabilizers and/or solvents.

The non-reactive polymers may with preference be polyolefins, polyacrylates, and polymers based on ethylene and vinyl acetate, having vinyl acetate contents of 0% to 80% by weight, or polyacrylates, and also mixtures thereof.

The non-reactive components are preferably added at the beginning of the preparation of the reactive polyurethane composition, but can also be added after the second process stage.

The reactive polyurethane compositions of the invention are suitable in particular for use as a one-component reactive adhesive or as a coating material.

The invention is elucidated in more detail below with reference to exemplary embodiments.

Starting from the same mixture of polyester polyols in each case, reactive polyurethane compositions were prepared which have a residual isocyanate content of in each case approximately 1.4%, and can be used as one-component reactive adhesives.

The polyester polyol mixture was in each case prepared as follows:

25 parts by weight of polyester polyol Dynacoll® 7130 from Degussa AG, 25 parts by weight of polyester polyol Dynacoll® 7250 from Degussa AG, 25 parts by weight of polyester polyol Dynacoll® 7380 from Degussa AG and 0.2 part by weight of amine accelerant Jeffcat® DMDLS from Huntsman were subjected to preliminary stirring in a glass vessel, using a paddle stirrer, and to dewatering at 130° C. for 60 minutes.

COMPARATIVE EXAMPLE 1

In a first comparative example, starting from the polyester polyol mixture above, a polyurethane hotmelt adhesive without a low monomer content was prepared, by to the stated polyester polyol mixture 12.5 parts of 4,4'-MDI (Desmodur® 44 M from Bayer AG), in other words an isocyanate in a molar excess of the NCO groups relative to the OH groups of the polyester polyol mixture, and stirring at 120° C. for one hour.

COMPARATIVE EXAMPLE 2

Starting from the same polyester polyol mixture, a low-monomer-content polyurethane hotmelt adhesive in accordance with the prior art was prepared by adding 59 parts of demonomerized prepolymer based on TDI, Vorastar® LM1002 from Dow Chemicals, containing NCO groups in a molar excess over the OH groups of the polyester polyol mixture, and carrying out stirring at 120° C. for one hour.

INVENTIVE EXAMPLE 1

Starting from the same polyester polyol mixture, an inventive polyurethane hotmelt adhesive of low monomer content was prepared by initially forming, in a first process stage, a monomer-free thermoplastic polyurethane having isocyanate-reactive groups, by adding 3 parts by weight of 2,4'-MDI Lupranat® MCI and stirring at 120° C. for one hour. This low-monomer-content thermoplastic polyurethane was reacted in a second process stage with 44 parts by weight of a demonomerized prepolymer based on TDI, Vorastar® LM1002 from Dow Chemicals, at 120° C. for one hour.

INVENTIVE EXAMPLE 2

Starting from the same polyester polyol mixture, a further inventive polyurethane hotmelt adhesive of low monomer content was prepared by initially forming, in a first process stage, a monomer-free thermoplastic polyurethane having isocyanate-reactive groups, by adding 3 parts by weight of 4,1'-MDI Desmodur® 44 M from Bayer AG and stirring at 120° C. for one hour. The product was reacted in a second process stage with 44 parts by weight of a demonomerized prepolymer based on TDI, Vorastar® LM1002 from Dow Chemicals, at 120° C. for one hour.

The polyurethane hotmelt adhesives produced in accordance with Comparative Examples 1 and 2 and Inventive Examples 1 and 2 were each dispensed into watertight containers, and measurements were made in each case of the viscosity, the initial strength and the residual monomer content.

The melt viscosity was determined using a calibrated Brookfield HB DV2 viscometer with a 27 spindle at a rotational speed of 10 rpm.

The strength was determined by carrying out a tensile shear test based on DIN 53283. This was done by bonding beech test specimens measuring 100 mm×20 mm×2 mm together in overlap (bond area 20 mm×20 mm) and testing them by means of a calibrated tensile testing machine from Frank in the time intervals specified in the table below. The measurement values specified are in each case the average of five measurements.

The residual monomer content was determined following derivatization of the samples, by means of HPLC (UV detection).

The NCO content reported in the table below for the hotmelt adhesives was determined arithmetically.

TABLE

|  | Comp. Ex. 1 | Comp. Ex. 2 | Invent. Ex. 1 | Invent. Ex. 2 |
|---|---|---|---|---|
| Viscosity [mPas] | | | | |
| 120° C. | 15 400 | 39 200 | 20 800 | 48 000 |
| 140° C. | 9600 | 20 800 | 13 600 | 25 000 |
| NCO content [%] | 1.43 | 1.39 | 1.37 | 1.35 |
| Strength [N/cm$^2$] | | | | |
| 30 sec | 34 | 3 | 15 | 14 |
| 1 min | 51 | 9 | 18 | 16 |
| 5 min | 124 | 19 | 31 | 28 |
| Residual monomer content [%] | 1.11 | <0.1 | <0.1 | <0.1 |

The results set out in the table show that by means of the process of the invention it is possible to obtain a low-monomer-content hotmelt adhesive which features improved initial strengths over known hotmelt adhesives of low monomer content (Comparative Experiment 2) and a lower reduction in initial strength than known hotmelt adhesives not of low monomer content (Comparative Experiment 1).

The invention claimed is:

1. Process for preparing a reactive polyurethane composition in the form of a polyurethane hot melt adhesive having a residual monomer content of less than 0.1% by weight, which process comprises:
   in a first process step, reacting
      an isocyanate-reactive polymer, or mixture of isocyanate-reactive polymers, said polymer or mixture of polymers having isocyanate reactive end groups and containing at least 90% by weight of linear molecules, with
      a polyisocyanate having a molecular weight less than 500,
   wherein the isocyanate groups of the polyisocyanate are present in a molar deficit relative to the isocyanate-reactive end groups of the polymer or mixture of polymers in a molar ratio of 1:1.1 to 1:5,
   to produce a monomer-free thermoplastic polyurethane which contains isocyanate-reactive end groups as a first product; and
   in a second process step, reacting
      the first product with
      a low-monomer-content, isocyanate-terminal prepolymer, wherein said prepolymer is prepared by reacting polyether polyols with an excess of polyisocyanate followed by removal of monomeric isocyanate by means of a thin film evaporator, wherein the isocyanate-reactive end groups of the thermoplastic polyurethane first product relative to the isocyanate groups of the prepolymer are present in a molar ratio of 1:1.1 to 1:5,
to produce the reactive polyurethane composition.

2. Process according to claim 1, wherein in the first process step an isocyanate-reactive polymer or mixture of isocyanate-reactive polymers with a fraction of at least 95% by weight of linear molecules is reacted.

3. Process according to claim 2, wherein in the first process step an isocyanate-reactive polymer or mixture of isocyanate-reactive polymers with a fraction of at least 99% by weight of linear molecules is reacted.

4. Process according to claim 1, wherein the molar ratio of the isocyanate-reactive end groups of the polymer or mixture of polymers to the isocyanate groups of the polyisocyanate in the first process step and/or the molar ratio of the isocyanate groups of the prepolymer to the isocyanate-reactive end groups of the thermoplastic polyurethane in the second process step is in the range from 2:1 to 3:1.

5. Process according to claim 1, wherein the isocyanate-reactive end groups are hydroxyl groups, amino groups, carboxyl groups, carboxylic anhydride groups and/or mercapto groups.

6. Process according to claim 1, wherein the isocyanate-reactive polymer or mixture of isocyanate-reactive polymers is one or more substances selected from the group consisting of polyesters, di- or trifunctional polyethylene or polypropylene glycols, polytetrahydrofurans, polyamides, copolymers thereof, and block copolymers thereof.

7. Process according to claim 1, wherein the isocyanate-reactive polymers used are polyester polyols having a number-average molecular weight of between 400 and 25,000 g/mol, and/or polyalkylene oxides having a number-average molecular weight of between 250 and 12,000 g/mol.

8. Process according to claim 7, wherein the isocyanate-reactive polymers used are polyester polyols having a number-average molecular weight of between 1000 and 10,000 g/mol, and/or polyalkylene oxides having a number-average molecular weight of between 500 and 4000 g/mol.

9. Process according to claim 7, wherein the isocyanate-reactive polymers used are polyester polyols having a number-average molecular weight of between 2000 and 6000 g/mol.

10. Process according to claim 1, wherein the polyisocyanate having a molecular weight of less than 500 is a substance or mixture of substances selected from aromatic, aliphatic or cycloaliphatic polyisocyanates having an isocyanate functionality of 2.

11. Process according to claim 1, wherein the polyisocyanate having a molecular mass less than 500 is selected from the group consisting of diisocyanatodiphenylmethanes (MDIs), mixtures of different diisocyanatodiphenylmethanes, hydrogenated 4,4'-MDI (bis 4-isocyanatocyclohexyl)methane, hydrogenated 2,4'-MDI, tetramethylxylylene diisocyanate (TMXDI), xylylene diisocyanate (XDI), 1,5-diisocyanatonaphthalene (NDI), diisocyanato-toluenes (TDIs), TDI urethdiones, TDI ureas, 1-isocyanato-3-isocyanatomethyl-3,S,5-trimethylcyclohexane (IPDI) and its isomers and derivatives, IPDI isocyanurate (IPDI-T), 3,3'-dimethylbiphenyl-4,4'-diisocyanate (TODI), 3,3'-diisocyanato-4,4'-dimethyl-N,N'-diphenylurea (TDIH), and hexamethylene 1,6-diisocyanate (HDI).

12. Process according to claim 11, wherein the polyisocyanate having a molecular mass of less than 500 is selected from 4,4'-diisocyanatodiphenylmethane, 2,4'-diisocyanatodiphenylmethane, 2,4-diisocyanatotoluene, dimeric 1-methyl-2,4-phenylene diisocyanate (TDI-U), 1-isocyanato-3-isocyanatomethyl-3,5,5-trimethylcyclohexane (IPDI), and dimers, trimers and polymers thereof.

13. Process according to claim 12, wherein the polyisocyanate is 2,4'-diisocyanato-diphenylmethane (2,4'-MDI) having a maximum fraction of the sum of 2,2'-diisocyanatodiphenylmethane (2,2'-MDI) and 4,4'-diisocyanatodiphenylmethane (4,4'-MDI) of 2.5% by weight, based on the total weight of the polyisocyanate.

14. Process according to claim 1, wherein the monomer-reduced isocyanate-terminated prepolymer for use in the second process step is one or more substances selected from the reaction products of polyethers with polyisocyanates.

15. Process according to claim 1, wherein the monomer-reduced isocyanate-terminated prepolymer for use in the second process step is one or more substances selected from diisocyanatotoluene (TDI), diisocyanatohexane (HDI) and/or isocyanato-3-isocyanatomethyl-3,5,5-trimethylcyclohexane (IPDI).

16. Process according to claim 1, wherein the first and/or the second process step is carried out at a temperature in the range from 80 to 140° C.

17. Process according to claim 14, wherein the monomer-reduced isocyanate-terminated prepolymer for use in the second process step is one or more substances selected from the reaction products of polypropylene glycols with polyisocyanates.

* * * * *